US009569682B2

(12) United States Patent
Yahata et al.

(10) Patent No.: US 9,569,682 B2
(45) Date of Patent: Feb. 14, 2017

(54) IMAGE PROCESSING APPARATUS AND METHOD TO PERFORM NOISE REDUCTION ON AN IMAGE AND DETERMINE AN OUTPUT PIXEL VALUE

(71) Applicant: CANON KABUSHIKI KAISHA, Tokyo (JP)

(72) Inventors: Kazuhiro Yahata, Kunitachi (JP); Yoshitaka Sasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/183,730

(22) Filed: Feb. 19, 2014

(65) Prior Publication Data
US 2014/0240556 A1 Aug. 28, 2014

(30) Foreign Application Priority Data
Feb. 27, 2013 (JP) ................................. 2013-037743

(51) Int. Cl.
| G06K 9/00 | (2006.01) |
| G06K 9/40 | (2006.01) |
| G06T 5/00 | (2006.01) |
| G06T 5/20 | (2006.01) |

(52) U.S. Cl.
CPC ................. *G06K 9/40* (2013.01); *G06T 5/002* (2013.01); *G06T 5/20* (2013.01)

(58) Field of Classification Search
CPC .............. G06K 9/40; G06T 5/002; G06T 5/20
See application file for complete search history.

(56) References Cited

U.S. PATENT DOCUMENTS

| 6,178,205 B1* | 1/2001 | Cheung | H04N 5/145 |
| | | | 348/E5.066 |
| 6,191,794 B1* | 2/2001 | Priem | G06T 15/04 |
| | | | 345/428 |
| 2010/0046709 A1* | 2/2010 | Ueki | A61B 6/032 |
| | | | 378/98 |
| 2010/0141804 A1 | 6/2010 | Morel et al. | |
| 2012/0268623 A1 | 10/2012 | Morel et al. | |

FOREIGN PATENT DOCUMENTS

| JP | 2007-536662 A | 12/2007 |
| JP | 2010-245977 A | 10/2010 |

* cited by examiner

*Primary Examiner* — Nirav G Patel
(74) *Attorney, Agent, or Firm* — Carter, DeLuca, Farrell & Schmidt, LLP

(57) ABSTRACT

In a case where a weighted mean value is calculated by calculating weights according to a degree of similarity based on a target pixel, the mean value is affected by noise included in the target pixel. The mean value thereby converges at a value different from a true pixel value without noise and this appears as a remaining noise. To solve this problem, an output value of the target pixel is determined based on a correlation established among a weighted mean value of multiple reference pixels, a pixel value of the target pixel, and the true value of the target pixel.

18 Claims, 13 Drawing Sheets

| 100 | 100 | 100 | 100 | 100 |
|---|---|---|---|---|
| 100 | 100 | 100 | 100 | 100 |
| 100 | 100 | 100 | 100 | 100 |
| 100 | 100 | 100 | 100 | 100 |
| 100 | 100 | 100 | 100 | 100 |

STANDARD DEVIATION=0

FIG.5A

| 110 | 108 | 71 | 102 | 84 |
|---|---|---|---|---|
| 84 | 96 | 84 | 102 | 93 |
| 66 | 96 | 72 | 107 | 121 |
| 149 | 124 | 99 | 109 | 130 |
| 102 | 116 | 115 | 13 | 84 |

STANDARD DEVIATION=25.6

FIG.5B

| 102 | 101 | 96 | 100 | 98 |
|---|---|---|---|---|
| 98 | 98 | 98 | 99 | 98 |
| 96 | 99 | 95 | 100 | 102 |
| 108 | 103 | 99 | 101 | 103 |
| 100 | 102 | 102 | 88 | 98 |

STANDARD DEVIATION=3.57

FIG.5C

| 101 | 100 | 101 | 100 | 101 |
|---|---|---|---|---|
| 101 | 99 | 100 | 99 | 100 |
| 102 | 100 | 100 | 99 | 100 |
| 101 | 100 | 100 | 100 | 99 |
| 100 | 100 | 100 | 101 | 100 |

STANDARD DEVIATION=0.73

FIG.5D

IMAGE PROCESSING APPARATUS AND METHOD TO PERFORM NOISE REDUCTION ON AN IMAGE AND DETERMINE AN OUTPUT PIXEL VALUE

BACKGROUND OF THE INVENTION

Field of the Invention

The present invention relates to an image processing apparatus and an image processing method. To be more specific, the present invention relates to a technique of reducing noise in image data.

Description of the Related Art

The sensitivity of a camera is desired to be increased from those of conventional ones to capture darker scenes and subjects moving at a higher speed than before. However, since increasing the sensitivity of a camera increases noise, a noise reduction process for attenuating noise at a greater degree is required. In a case where the noise reduction process is performed by simple averaging or the like, the resolution of an image deteriorates. In view of this, techniques for reducing noise while preserving edges and textures are laid open (for example, Japanese Patent Laid-Open No. 2010-245977 and Japanese Patent Laid-Open No. 2007-536662). In these noise reduction techniques, a weighted mean value is calculated by calculating similarity between a target pixel for which noise is to be reduced and each of reference pixels around the target pixel, and then determining a weight according to the similarity. Then, the value of the target pixel is determined by using the weighted mean value.

However, in a case where the weighted mean value is calculated by calculating the weight according to the similarity based on the target pixel as described above, the mean value is affected by the noise included in the pixel value of the target pixel itself. Hence, such a technique has a problem that the weighted mean value converges not at a true pixel value of the target pixel but at a value different from the true pixel value without noise, even if the number of reference pixels is increased, and this appears as remaining noise.

SUMMARY OF THE INVENTION

An image processing apparatus of the present invention is an image processing apparatus for determining an output value of a target pixel by using weighted means of a plurality of reference pixels in image data including noise, comprising a determination unit configured to determine the output value of the target pixel on the basis of a correlation established among a weighted mean value of the plurality of reference pixels, a pixel value of the target pixel in the image data, and a true value of the target pixel.

In the present invention, it is possible to reduce remaining noise and obtain better image data after noise reduction.

Further features of the present invention will become apparent from the following description of exemplary embodiments (with reference to the attached drawings).

BRIEF DESCRIPTION OF THE DRAWINGS

FIGS. 5A to 5D are views showing an example of reducing the remaining noise;

DESCRIPTION OF THE EMBODIMENTS

Embodiments of the present invention are described below with reference to the drawings. Note that the embodiments described below are merely examples and do not intend to limit the scope of the present invention.

<First Embodiment>

The configuration of an image processing apparatus of a first embodiment is described with reference to FIG. 1.

Figure 1:
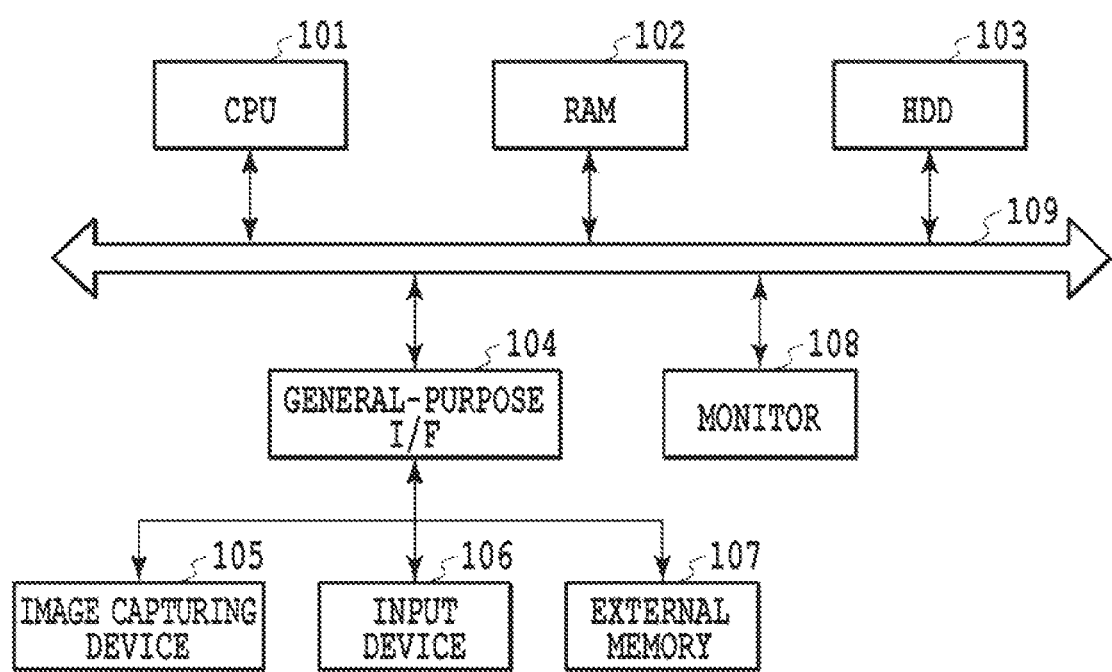
FIG. 1 is a block diagram showing an example of a configuration of an image processing apparatus in an embodiment.

In FIG. 1, the image processing apparatus includes a CPU 101, RAM 102, a HDD 103, a general-purpose interface (I/F) 104, a monitor 108, and a main bus 109. The general-purpose I/F connects an image capturing device 105 such as a camera, an input device 106 such as a mouse and a keyboard, and external memory 107 such as a memory card to the main bus 109.

Description is given below of various processes implemented by the CPU 101 running various kinds of software (computer programs) stored in the HDD 103.

First, the CPU 101 activates an image processing application stored in the HDD 103 and deploys the application on the RAM 102 while displaying a user interface (UI) on the monitor 108. Then, various kinds of data stored in the HDD 103 and the external memory 107, image data captured by the image capturing device 105, instruction data from the input device 106, and the like are transferred to the PAM 102. Moreover, various calculations on the data stored in the RAM 102 are performed based on instructions from the CPU 101, according to processes in the image processing application. Calculation results are displayed on the monitor 108 and are stored in the HDD 103 and the external memory 107.

In the configuration described above, according to the instruction from the CPU 101, image data to be a target of noise reduction and a noise reduction parameter are inputted to the image processing application and a noise reduction process is performed. Thereafter, a remaining noise reduction process is performed on the image data subjected to the noise reduction process. The details of these processes will be described. Description will be given first of noise reduction techniques, thereafter remaining noise in data subjected to the noise reduction process, and then the noise reduction process for the remaining noise.

<Description of Noise Reduction Process>

Figure 2:
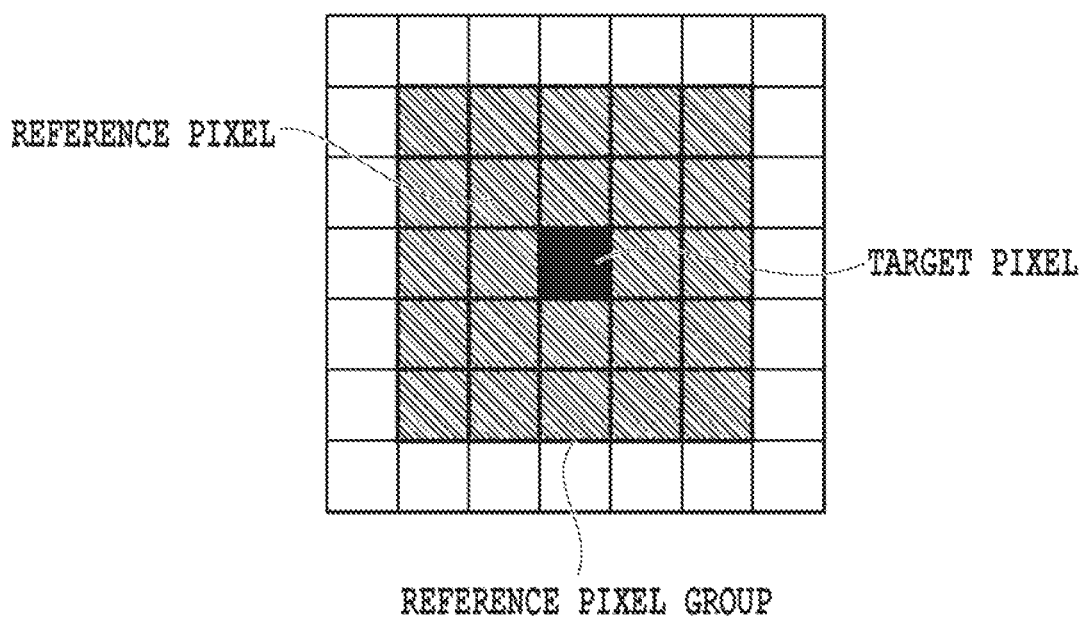
FIG. 2 is a view showing examples of a target pixel and reference pixels.

Generally, in the noise reduction process in image processing, multiple reference pixels are set near a target pixel for which noise is to be reduced, and an mean value is calculated by using pixel values respectively of the reference pixels and the target pixel. Then, the calculated mean value is set as the pixel value of the target pixel after the noise reduction. The simplest noise reduction process is a process of applying a smoothing filter. For example, as shown in FIG. 2, all of pixels in a 5×5 size region with the target pixel at the center are set as a reference pixel group and the mean value of the pixel values in the reference pixel group is calculated and set as the pixel value of the target pixel. However, in such a process of applying the smoothing filter, edges and fine textures are blurred and lost.

The simplest noise reduction process which can preserve edges and textures is a process in which the difference between the pixel value of the target pixel and each of the pixel values of the reference pixels is taken into consideration in the calculation of the mean value. In a case where the difference is smaller than a certain threshold S, the image processing apparatus determines to use the reference pixel for the calculation of the mean value. Meanwhile, in a case where the difference is greater than the threshold S, the image processing apparatus determines not to use the reference pixel for the calculation of the mean value. For example, in a case where the pixel value of the target pixel is 50 and the threshold S is 10, the image processing apparatus determines to use the reference pixels whose pixel values are within a range of 40 to 60 for the calculation of the mean value and determines not to use the reference pixels whose pixel values do not fall within this range for the calculation of the mean value. Edges and textures can be preserved to some extent by this determination.

Bilateral filtering and a non-local means method can be given as examples of processes more advanced than the aforementioned noise reduction process in which the reference pixels to be used for the calculation of the mean value are determined by using the threshold. These edge-preserving noise reduction processes generally use a weighted mean value of the pixel values in the reference pixel group. Here, assume that an i-th pixel of an inputted image to be subjected to the noise reduction process is set as the target pixel, the pixel value of a j-th pixel in the reference pixel group is expressed as $I_j$, and the pixel value of the i-th pixel of an image after the noise reduction process which corresponds to the target pixel is expressed as $I_{i,new}$. Moreover, the number of reference pixels included in the reference pixel group is expressed as Np. In such a case, the pixel value $I_{i,new}$ of the i-th pixel of the image after the noise reduction process can be expressed by the following formula.

$$I_{i,new} = \sum_{j}^{Np} w_{ij} I_j \bigg/ \sum_{j}^{Np} w_{ij} \quad (1)$$

In the formula, Σ means to obtain the sum and means to obtain the sum for an index j used to identify a pixel from the multiple reference pixels. Moreover, $w_{ij}$ represent a weight for the j-th reference pixel for the i-th target pixel. Note that, in a case where the target pixel is included in the multiple reference pixels, j=i may be satisfied in the above formula.

Differences between noise reduction process methods can be explained by differences in a method of calculating the weight $w_{ij}$ for each reference pixel. Generally, the weight $w_{ij}$ is determined according to similarity between the target pixel and the reference pixel. For example, in the simplest example described above, the weight $w_{ij}$ is as follows.

$$w_{ij} = \begin{cases} 1 & \text{if } |I_i - I_j| \leq S \\ 0 & \text{if } |I_i - I_j| > S \end{cases} \quad (2)$$

In this process, the absolute value of the difference between the image pixels is used as the similarity. The reference pixel is assumed to be similar to the target pixel in a case where the absolute value of the difference between the pixel values is small, and is used for the calculation of the mean value performed to obtain the pixel value of the target pixel. The reference pixel is assumed to be not similar to the target pixel in a case where the absolute value of the difference between the pixel values is great, and is not used for the calculation of the mean value performed to obtain the pixel value of the target pixel.

Moreover, in the bilateral filtering, the weight $w_{ij}$ for the j-th reference pixel is defined as follows.

$$w_{ij} = \exp\left(-\frac{(I_i - I_j)^2}{\sigma_I^2}\right) \exp\left(-\frac{r_{ij}^2}{\sigma_r^2}\right) \quad (3)$$

In this formula, $\sigma_I$ and $\sigma_r$ represent parameters for determining the strength of noise reduction. Moreover, $r_{ij}$ represent the distance between the i-th target pixel and the j-th reference pixel on the image. The formula is defined such that the reference pixel is assumed to have a high degree of similarity to the target pixel in a case where the difference of the pixel values is small and the distance between the pixels is small, and the weight is increased in such a case.

Figure 3:
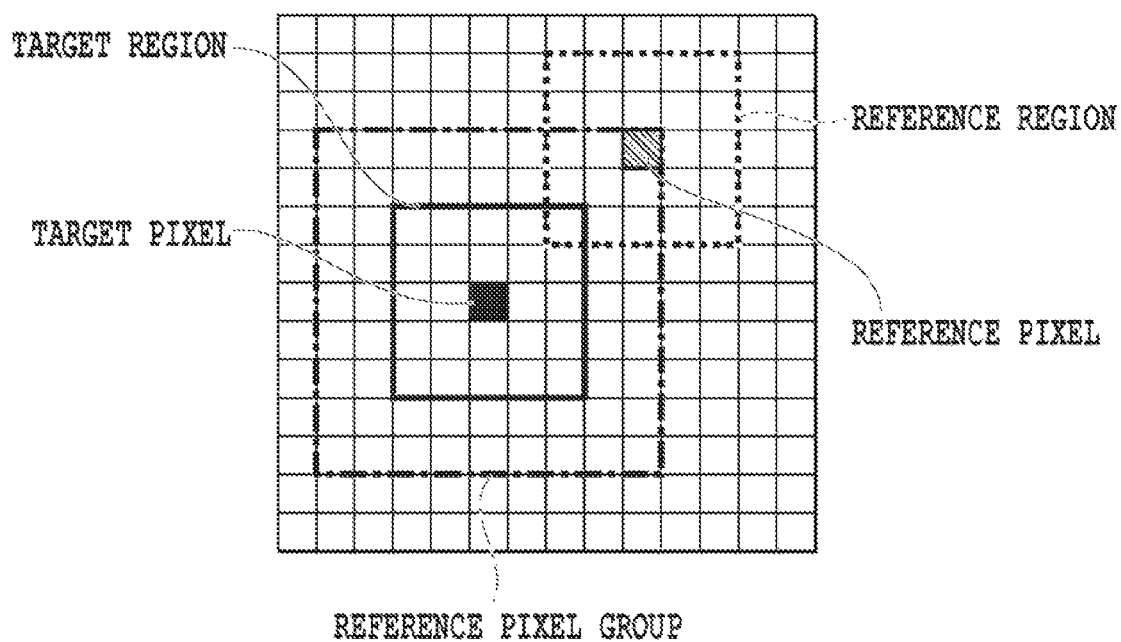
FIG. 3 is a view showing examples of a target region and a reference region in a non-local means method.

In the non-local means method, block matching is incorporated in the evaluation of the similarity. Specifically, as shown in FIG. 3, a region around the target pixel is set as a target region and a region around the reference pixel is set as a reference region. Then, a square of a difference between each of the pixels included in the target region and a corresponding one the pixels included in the reference region is calculated. Thereafter, the sum of the squares is obtained and the similarity $S_{ij}$ is thus calculated. This is expressed in the following formula.

$$S_{ij} = \sum_{k}^{Nb} (I_{ik} - I_{jk})^2 \quad (4)$$

In this formula, Nb represents the number of reference region pixels, $I_{ik}$ represents the pixel value of the k-th pixel forming the target region, and $I_{jk}$ represents the pixel value of the k-th pixel forming the reference region for the j-th reference pixel. The weight for the j-th reference is calculated as follows. The value of the similarity $S_{ij}$ is 0 in a case where the pixel values of the pixels forming the target region and the reference region are exactly the same, and becomes greater as the difference between the pixel values becomes greater. The weight $w_{ij}$ is calculated as follows by using the similarity $S_{ij}$.

$$w_{ij} = \exp\left(-\frac{S_{ij}}{h^2}\right) \quad (5)$$

In this formula, h represents a parameter for determining the strength of noise reduction. Note that this method is called non-local means because the reference pixels are set not in a local region of the image but in the entire image. However, noise reduction effects can be obtained even if the reference pixels are limitedly set in a local region of the image.

That is the description of the typical edge-preserving noise reduction techniques.

<Description of Remaining Noise>

Figure 4:
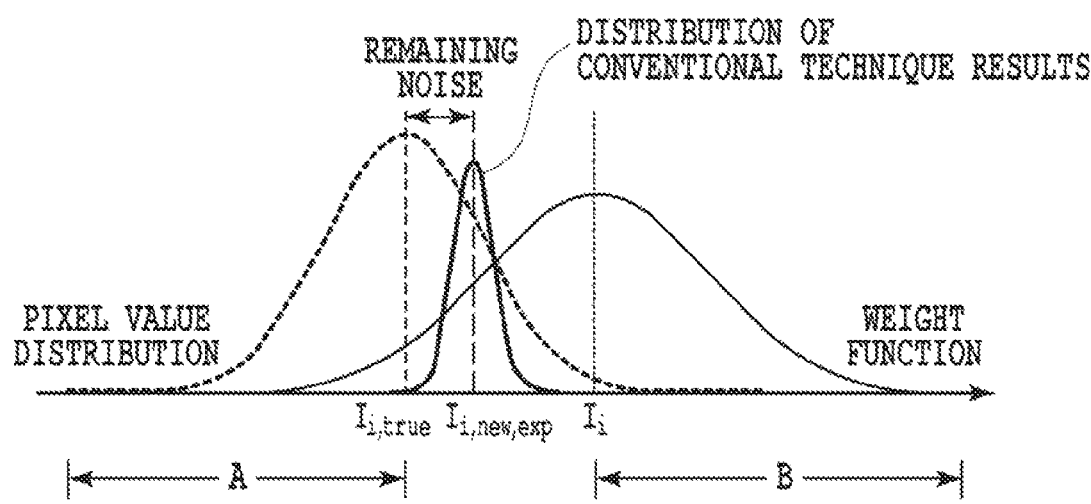
FIG. 4 is a conceptual view showing how remaining noise occurs.

Next, by using FIG. 4, description is given of the remaining noise occurring in a weighted averaging process which is the edge-preserving noise reduction technique described above. The remaining noise is a special noise which is not reduced (i.e. remains) even if the number of reference pixels is increased in the noise reduction process using the weighted averaging process.

FIG. 4 is a conceptual view showing the difference between a true pixel value and an expected value obtained in a case where the weighted mean value is calculated according to the similarity between the target pixel and each reference pixel as in the conventional techniques. The true pixel value is an ideal value including no noise at all. In other words, the true pixel value is a value from which the noise is completely removed. Although showed in a simplified manner, the drawing sufficiently shows that the expected value of the conventional technique is not equal to the true pixel value. The horizontal axis of FIG. 4 shows the pixel value. Moreover, in FIG. 4, pixel value distribution shows a distribution of frequency for each pixel value and weight function shows a weight corresponding to each pixel value.

First, the true pixel value of the target pixel is expressed as $I_{i,true}$. Moreover, the true pixel values of the pixels in the reference pixel group are all assumed to be the same as the true pixel value $I_{i,true}$. In other words, consider the target pixel and the reference pixel group in image data in which the pixel values are all the same in a state without noise. In this case, the distribution of the pixel values of the reference pixels including noise (i.e. the pixel values of the reference pixels in the actual image data in which noise occurs) spreads around the true pixel value $I_{i,true}$ (see "pixel value distribution" of FIG. 4). The reason why the distribution of the pixel values of the reference pixels including noise spreads around the true pixel value $I_{i,true}$ is because varying amounts of noise are included respectively in the reference pixels.

Here, the pixel value $I_i$ of one target pixel is assumed to be greater than the true pixel value $I_{i,true}$ due to noise. As described above, the weight for each reference pixel is determined according to the similarity between the target pixel and the reference pixel. The similarity between the target pixel and each reference pixel generally becomes smaller as the pixel value of the reference pixel becomes farther from the pixel value $I_i$ of the target pixel. Thus, the weight also becomes smaller as the pixel value of the reference pixel becomes farther from the pixel value $I_i$ of the target pixel (see "weight distribution" in FIG. 4). In other words, the weight for the reference pixel is high near the pixel value $I_i$ of the target pixel and is low in a portion away from the pixel value $I_i$ of the target pixel. The value of the weighted mean calculated in this case is based on the pixel values of the reference pixels and the weights for the reference pixels as shown in formula (1). As is apparent from FIG. 4, in a range where the pixel value of each reference pixel is near or smaller than the true pixel value $I_{i,true}$ (section A of FIG. 4), the number of pixels having such pixel values is relatively great because the value of the pixel value distribution is great, but the weights for these pixels are small. Meanwhile, in a range where the pixel value of each reference pixel is near or greater than the pixel value $I_i$ of the target pixel (section B of FIG. 4), the weights for the pixels are great but the number of pixels having such pixel values is small. In the end, only the pixel values which have both a great frequency in the pixel value distribution and a great weight in FIG. 4 mainly contribute to the weighted mean value. Accordingly, the pixel value $I_{i,new}$ of the target pixel which is the weighted mean value is distributed between the true pixel value $I_{i,true}$ and the pixel value $I_i$ of the target pixel (see "distribution of conventional technique results" in FIG. 4). Here, the expected value in a probability distribution of the conventional technique results is expressed as $I_{i,new,exp}$.

The dispersion (spread of distribution) of the weighted mean value becomes smaller as the number of reference pixels becomes greater. However, the weighted mean value converges not at the true pixel value $I_{i,true}$ but at the expected value $I_{i,new,exp}$. The expected value $I_{i,new,exp}$ is dependent on the pixel value $I_i$ of the target pixel including noise and the difference between the true pixel value $I_{i,true}$ and the expected value $I_{i,new,exp}$ is not reduced even if the number of reference pixels is increased. In other words, in the case where the weights are determined based on the pixel value $I_i$ of the target pixel, the expected value $I_{i,new,exp}$ does not become equal to the true pixel value $I_{i,true}$. In a case where the difference between the true pixel value $I_{i,true}$ and the expected value $I_{i,new,exp}$ is greater than the dispersion of the weighted mean value, the difference is recognized as the remaining noise. As is apparent from FIG. 4, the remaining noise is smaller than the original noise (i.e. the difference between the pixel value $I_i$ of the target pixel and the true pixel value $I_{i,true}$). Accordingly, in a case where the original noise is not so great, the remaining noise is not so visible because the remaining noise is smaller than the original noise. However, in a case where the original noise is great, the remaining noise also becomes great along with the original noise and thus becomes visible. Particularly, in a region with a large area of a uniform color such as sky and wall surfaces, the remaining noise is visible and thereby needs to be reduced. That is the description of the remaining noise.

The remaining noise described in FIG. 4 occurs in the case where the weights are determined based on the pixel value of the target pixel. In, for example, a process in which the weights are not determined based on the pixel value of the target pixel like the aforementioned method of using the averaging filter, the weights are constants. In this case, the expected value $I_{i,new,exp}$ is equal to the true pixel value $I_{i,true}$. Thus, the distribution of conventional technique results of FIG. 4 will be a distribution centering at the true pixel value $I_{i,true}$ in FIG. 4. In other words, the problem of remaining noise like one described in FIG. 4 is inevitable in the case where the weights are determined based on the pixel value of the target pixel.

In the embodiment, description is given of the process of reducing the remaining noise.

<Principles of Remaining Noise Reduction Process>

Next, description is given of principles of the remaining noise reduction process of the embodiment. As described above, the remaining noise is the difference between the true pixel value $I_{i,true}$ and the expected value $I_{i,new,exp}$ of the target pixel after the noise reduction process. In view of this, description is given below of principles of reducing the remaining noise by reducing the difference between the true pixel value $I_{i,true}$ and the expected value $I_{i,new,exp}$ of the target pixel after the noise reduction process.

First, the expected value $I_{i,new,exp}$ of the pixel value $I_{i,new}$ of the target pixel after the noise reduction process is calculated as follows.

$$I_{i,new,exp} = \langle I_{i,new} \rangle \tag{6}$$

Here, the angle brackets in the formula mean that a statistical expected value is calculated. Formula (1) for the weighted mean value is substituted into formula (6) as shown below.

$$I_{i,new,exp} = \left\langle \sum_{j}^{Np} w_{ij} I_j \Big/ \sum_{j}^{Np} w_{ij} \right\rangle \tag{7}$$

The weight $w_{ij}$ is assumed to be dependent on at least the pixel value $I_i$ of the target pixel and the pixel value $I_j$ of the reference pixel. A specific method for calculating the weights varies depending on each of noise reduction process techniques. In a noise reduction process technique which uses one or more parameters $\xi_{method}$ for the weight calculation, the calculated weight is dependent also on the parameters $\xi_{method}$. Hereafter, the parameter $\xi_{method}$ is referred to as noise reduction parameter. For example, $\sigma_I$ and $\sigma_r$ correspond to the noise reduction parameters $\xi_{method}$ in the bilateral filtering and h corresponds to the noise reduction parameter $\xi_{method}$ in the non-local means method.

Next, description is given of a method of statistically calculating the expected value $I_{i,new,exp}$ of the target pixel after the noise reduction process. Note that the pixel value $I_i$ of the target pixel for which the expected value is to be obtained in the embodiment can be obtained from the image data. Accordingly, the expected value $I_{i,new,exp}$ is calculated under the condition where the pixel value $I_i$ of the target pixel is determined. The expected value $I_{i,new,exp}$ of the pixel value $I_{i,new}$ of the target pixel after the noise reduction process is calculated as follows. As shown in FIG. 3, the pixels required for the weight calculation include, in addition to the target pixel and the reference pixels, pixels which are not included in the reference pixel group but are included in the reference region for any one of the reference pixels. Here, the pixel values of the pixels which are not included in the reference pixel group but are required for the weight calculation is expressed as $I_{others}$. The expected value $I_{i,new,exp}$ is calculated by: multiplying the pixel value $I_{i,new}$ of the target pixel after the noise reduction process by the probability distribution function of the pixel value $I_j$ of the reference pixel and the pixel values $I_{others}$ of all of the pixels other than the target pixel and the reference pixel which relate to the weight calculation; and thereby obtaining an integral of $I_j$ and $I_{others}$. Here, the pixel values $I_{others}$ are set as a vector. The pixel value distribution of the pixel value $I_j$ of the reference pixel and the pixel values $I_{others}$ of all of the pixels other than the target pixel and the reference pixel are determined depending on the true pixel value and the noise amount of each pixel. One or more parameters determining the pixel value distribution of these pixel values are expressed collectively as $\sigma_{true}$. Hereafter, $\sigma_{true}$ is referred to as pixel value distribution model parameter. In view of this, formula (7) is modified as follows.

$$I_{i,new,exp} = \int dI_j \, dI_{others} P(I_j, I_{others}, \sigma_{true}) \tag{8}$$

$$\left( \sum_{j}^{Np} w_{ij}(I_i, I_j, I_{others}, \xi_{method}) I_j \right) \Big/ \sum_{j}^{Np} w_{ij}(I_i, I_j, I_{others}, \xi_{method})$$

As described above, since the weight $w_{ij}$ is dependent on at least the pixel value $I_i$ of the target pixel, the pixel value $I_j$ of the reference pixel, and the noise reduction parameter $\xi_{method}$, these values are explicitly shown in $w_{ij}$ of formula (8). Note that $I_{others}$ is included in $w_{ij}$ of formula (8) because pixels other than the reference pixel which form the reference region are used for the weight calculation in, for example, the non-local means method, and consideration is given to such cases. In other words, since the weight $w_{ij}$ is dependent on the pixel values $I_{others}$ other than the pixel value $I_i$ of the target pixel and the pixel value $I_j$ of the reference pixel in some cases depending on the weight calculation method, the pixel values $I_{others}$ are included in $w_{ij}$ of formula (8). $P(I_j, I_{others}, \sigma_{true})$ show the aforementioned probability distribution function of the pixel value $I_j$ of the reference pixel and the pixel values $I_{others}$ of all of the pixels other than the target pixel and the reference pixel. Moreover, $P(I_j, I_{others}, \sigma_{true})$ includes, as a parameter, the pixel value distribution model parameter $\sigma_{true}$ relating to the distribution of these pixel values. The probability distribution function $P(I_j, I_{others}, \sigma_{true})$ can be modeled into a specific form from statistical characteristics of noise of an image sensor, the true pixel value of the image, and the like. In other words, the probability distribution function $P(I_j, I_{others}, \sigma_{true})$ can be modeled into a specific form according to the pixel value distribution mode parameter $\sigma_{true}$. For example, the noise distribution is assumed to be a Gaussian distribution having a standard deviation $\sigma$. Moreover, the true pixel value of the pixel value $I_j$ of the reference pixel and the true pixel values of the pixel values $I_{others}$ of the pixels other than the target pixel and the reference pixel are assumed to be respectively $I_{j,true}$ and $I_{others,true}$. In this case, the probability distribution function $P(I_j, I_{others}, \sigma_{true})$ can be expressed by the following formula.

$$P(I_j, I_{others}, I_{j,true}, I_{others,true}, \sigma) = \frac{1}{\sqrt{2\pi\sigma^2}} \tag{9}$$

$$\exp\left(-\frac{[I_j - I_{j,true}]^2}{2\sigma^2}\right) \prod_{m=1}^{N_{others}} \left\{ \frac{1}{\sqrt{2\pi\sigma^2}} \exp\left(-\frac{[I_m - I_{others,true}]^2}{2\sigma^2}\right) \right\}$$

In this formula, $N_{others}$ represents the number of elements of $I_{others}$. The reason why the true pixel value of the reference pixel and the true pixels are assumed to be $I_{j,true}$ and $I_{others,true}$ is to show that the distribution of the pixel values varies around the true pixel value depending on the standard deviation $\sigma$ of the noise. In formula (9), the true pixel value $I_{j,true}$ of the reference pixel, the true pixels $I_{others,true}$ of the other pixels, and the standard deviation $\sigma$ of the noise correspond to the pixel value distribution model parameter $\sigma_{true}$ shown in formula (8). Formula (9) shows an example where the noise distribution is assumed to be the Gaussian distribution having the standard deviation $\sigma$. However, in a case where the noise distribution follows a different distribution, the pixel value distribution model parameter $\sigma_{true}$ shown in formula (8) can correspond to functions and values following this distribution.

Next, let us return to the description of the calculation of the expected value of the pixel value of the target pixel after the noise reduction.

The expected value $I_{i,new,exp}$ for each of the weighted mean values can be calculated by substituting a weight calculation method corresponding to the weighted mean value into the weight $w_{ij}$ of formula (8). Although, various variables are shown in the right side of formula (8), the variables ($I_j$, $I_{others}$) which can be eliminated by integration are considered. In this case, it can be found that the expected value $I_{i,new,exp}$ of the pixel value of the target pixel after the noise reduction process is dependent on the pixel value $I_j$ of the target pixel, the noise reduction parameter $\xi_{method}$, and the pixel value distribution model parameter $\sigma_{true}$. In other words, the expected value $I_{i,new,exp}$ of the pixel value of the target pixel after the noise reduction process can be obtained according to the pixel value $I_i$ of the target pixel, the noise reduction parameter $\xi_{method}$, and the pixel value distribution model parameter $\sigma_{true}$.

This can be formally expressed in a function h shown below.

$$I_{i,new,exp} = h(I_i, \xi_{method}, \sigma_{true}) \quad (10)$$

The basic idea of the noise reduction process is described before considering the formula shown above. The noise reduction process fails unless some of the reference pixels have the true pixel values which are the same as the true pixel value of the target pixel. Particularly, this idea is supported also by the fact that the weighted averaging employs a method in which the weight of the reference pixel having the same pixel value as the pixel value of the target pixel is set to be great. Thus, it can be considered that the same value as the true pixel value $I_{i,true}$ of the target pixel is included in the pixel value distribution model parameter $\sigma_{true}$. To show this fact explicitly, formula (10) is rewritten in such a way that the true pixel value $I_{i,true}$ is separated from the pixel value distribution model parameter $\sigma_{true}$. Formula (10) can be thus expressed by the following function f.

$$I_{i,new,exp} = f(I_i, I_{i,true}, \xi_{method}, \sigma_{true}) \quad (11)$$

The meaning of formula (11) can be understood more easily by being combined with the graph shown in FIG. 4. The true pixel value $I_{i,true}$ of the target value and the expected value $I_{i,new,exp}$ of the pixel value of the target pixel after the noise reduction process of formula (11) correspond respectively to $I_{i,true}$ and $I_{i,new,exp}$ of FIG. 4. Part of the pixel value distribution model parameter $\sigma_{true}$ of formula (11) corresponds to the pixel value distribution of FIG. 4. Part of the noise reduction parameter $\xi_{method}$ of formula (11) corresponds to the weight function of FIG. 4.

Formula (11) is solved for the true pixel value $I_{i,true}$. The true pixel value $I_{i,true}$ can be thereby obtained as a function g of the pixel value $I_i$ of the target pixel, the expected value $I_{i,new,exp}$ of the pixel value after the noise reduction process, the noise reduction parameter $\xi_{method}$, and the pixel value distribution model parameter $\sigma_{true}$.

$$I_{i,true} = g(I_i, I_{i,new,exp}, \xi_{method}, \sigma_{true}) \quad (12)$$

Depending on the type of the weight calculation method, i.e. the noise reduction process technique, it may be difficult to obtain the function g by performing these calculations analytically. However, the function g can be loosely evaluated by using various approximations. Moreover, the function g can be always numerically evaluated by using a computer.

Formula (12) has the following meaning in the case where the inputted image data follows a certain pixel value distribution model specified by $\sigma_{true}$. Specifically, formula (12) means that the true pixel value $I_{i,true}$ of the target pixel is determined from the pixel value $I_i$ of the target pixel and the expected value $I_{i,new,exp}$ of the pixel value after the noise reduction process specified by $\xi_{method}$. As shown by the distribution of conventional technique results of FIG. 4, the pixel value $I_{i,new}$ of the target pixel after the noise reduction varies to some extent around the expected value $I_{i,new,exp}$ of the pixel value after the noise reduction process. The expected value is the mean value of numeric values obtained as results of a trial, and it is well known that the actual processing results vary around the expected value.

In other words, formula (12) means that a correlation corresponding to the noise reduction process method is established among the pixel value $I_i$ of the target pixel, the pixel value $I_{i,new}$ after the noise reduction, and the true pixel value $I_{i,true}$ of the target pixel. The correlation corresponding to the noise reduction process method is a correlation corresponding to the parameter $\sigma_{true}$ specifying the distribution of the pixel value and the parameter $\xi_{method}$ specifying the noise reduction process.

In the embodiment, the remaining noise reduction process is performed based on this correlation. In addition to the pixel value $I_i$ of the target pixel, the noise reduction parameter $\xi_{method}$, and the pixel value distribution model parameter $\sigma_{true}$, the expected value $I_{i,new,exp}$ of the pixel value after the noise reduction process is required to estimate the true pixel value $I_{i,true}$ by using formula (12). As described above, the pixel value $I_{i,new}$ of the target pixel after the noise reduction varies to some extent around the expected value $I_{i,new,exp}$ of the pixel value after the noise reduction process. Thus, $I_{i,new}$ obtained by the noise reduction process is not exactly equal to the expected value $I_{i,new,exp}$ in some cases. However, the pixel value $I_{i,new}$ of the target pixel after the noise reduction is a good estimated value of the expected value $I_{i,new,exp}$. Accordingly, in the embodiment, the actually-obtained weighted mean value (i.e. the pixel value after the noise reduction) $I_{i,new}$ is assumed to be the expected value $I_{i,new,exp}$, and the weighted mean value $I_{i,new}$ is substituted into the expected value $I_{i,new,exp}$ of formula (12). The estimated value of the true pixel value $I_{i,true}$ can be thereby calculated from the pixel value $I_i$ of the target pixel, the true pixel value $I_{i,new}$ after the noise reduction process, and the parameters $\xi_{method}$ and $\sigma_{true}$. In the estimated value obtained as described above, the aforementioned remaining noise is reduced. Noise mainly remaining in this estimated value is due to the dispersion of the weighted mean value $I_{i,new}$, obtained by the noise reduction process with respect to the expected value $I_{i,new,exp}$ thereof.

Generally, the estimation is performed as shown in formula (12). However, in a case where a region around the target pixel and a region around the reference pixel have the same pixel value as the target pixel and the noise reduction process is performed in consideration of noise variance, the function g may not be depend on the pixel value distribution model parameter $\sigma_{true}$. In other words, a simpler formula shown below may be used in some cases.

$$I_{i,true} = g(I_i, I_{i,new,exp}, \xi_{method}) \quad (13)$$

Moreover, in a case where the function g is linear or approximately linear to $I_i$ and $I_{i,new,exp}$, formula (13) may be expressed as follows in some cases.

$$I_{i,true} = \gamma I_{i,new,exp} + (1-\gamma) I_i \quad (14)$$

Here, γ is a parameter calculated from the noise reduction parameter $\xi_{method}$ and has a value greater than 1. Typically, γ is about 1 to 1.5. In other words, in formula (14), the true pixel value $I_{i,true}$ can be interpreted as a point which externally divides a section between the pixel value $I_i$ before the noise reduction process and the pixel value $I_{i,new}$ after the noise reduction process and which is on the $I_{i,new}$ side (weighted mean value side). This can be understood also from the magnitude relation among the $I_{i,true}$, $I_{i,new,exp}$, and $I_i$ of FIG. 4.

As described above, the model for the distribution of the true pixel value (pixel value distribution model parameter $\sigma_{true}$) is required for the evaluation of the function g. Examples of conceivable models include a model used to determine whether all of pixels have a substantially constant value as in sky or a wall, a model used determine whether an edge exists, and a similar models. Strictly speaking, since the distribution of the true pixel values cannot be known from the noise image, it is impossible to completely erase the remaining noise without an error in any kind of image. However, the amount of remaining noise is smaller than that of the original noise and the remaining noise is particularly visible mainly in a region where the pixel values are substantially constant. Hence, an image improving effect can be obtained even if the function g evaluated under the assumption that the pixel values are substantially constant is used to perform the remaining noise reduction process. If a higher accuracy is required, it is possible to estimate whether each of regions of the image is a portion in which the pixel values are substantially constant, whether the region is a portion having an edge, or perform similar estimation, and then select an appropriate function g based on the result of the estimation. Moreover, as described above, the function g can be loosely evaluated in advance by using various approximates or evaluated by using a computer. Alternatively, a four-dimensional lookup table corresponding to the function g can be prepared and the process can be performed based on such a table. The function g varies depending on the noise reduction process method and the pixel value distribution. Accordingly, an appropriate function g can be applied according to each of the noise reduction processing methods (for example, non-local means method and the bilateral filtering) and each of the pixel value distributions (edge, solid, or the like).

Moreover, in the above example, description is given of the case where the noise reduction process is performed on one piece of image data. However, the embodiment can be applied to a noise reduction process using multiple pieces of image data. For example, the embodiment can be applied to a noise reduction process using continuously-captured pieces of image data of the same subject.

Moreover, the embodiment can be applied also to a type of noise reduction process which uses a dictionary (multiple images prepared in advance). In the type of noise reduction process using the dictionary, the reference pixel and the reference region are selected from the dictionary prepared in advance and are compared with the target region. In this case, the following elements in the probability distribution function $P(I_j, I_{others}, \sigma_{true})$ of formula (8) are determined by using the dictionary. Specifically, the reference pixel I, the pixel values $I_{others}$ of all of the pixels other than the target pixel and the reference pixel, and an element corresponding to the reference region among the elements of the pixel value distribution model parameter $\sigma_{true}$ are determined by using the dictionary. Accordingly, there no need to think about the probability distribution of these values. This matter can be shown explicitly in a formula as follows.

$$I_{i,new,exp} = \int dI_{t,others} P(I_{t,others}, \sigma_{t,true}) \quad (15)$$

$$\left( \sum_{j}^{dic} w_{ij}(I_i, I_j, I_{others}, \xi_{method}) I_j \right) \bigg/ \sum_{j}^{dic} w_{ij}(I_i, I_j, I_{others}, \xi_{method})$$

In the above formula, dic represents the number of elements in the dictionary. Moreover, $I_{t,others}$ represent elements among the elements of $I_{others}$ which corresponds to the target region. For example, in the non-local means method, $I_{t,others}$ corresponds to the pixel values of the pixels forming the target region other than the pixel value $I_i$ of the target pixel. Similarly, $\sigma_{t,true}$ represents elements among the elements of $\sigma_{true}$ which relate to the target region. As described above, since the elements of the pixels corresponding to the reference region are selected from the dictionary, they are not included in the probability distribution function $P(I_{t,others}, \sigma_{t,true})$ of formula (15). Considering the fact that, also in the type of noise reduction process using the dictionary, the noise reduction process cannot be performed unless there is a correlation between the dictionary and the true pixel value of the target pixel, formula (15) can be reduced to a form of formula (11) and then to a form of formula (12). Note that the pixel value distribution model parameter $\sigma_{true}$ is $\sigma_{t,true}$ relating to the target region. Accordingly, the remaining noise reduction process described in the embodiment can be applied also to the type of noise reduction process using the dictionary, in a similar manner.

That is the principles of the remaining noise reduction process in the embodiment. Lastly, an actual example of an effect of the remaining noise reduction process is shown by using FIGS. 5A to 5D. FIG. 5A shows the pixel values of a 5×5 region of an image with no noise. In the example, all of the pixel values are 100. In other words, FIG. 5A is image data in which the true pixel values are all 100. FIG. 5B shows pixel values of one 5×5 region of an image in which noise following a Gaussian distribution whose standard deviation is about 24 exists on the image data of FIG. 5A. The image data of FIG. 5B is part of image data which is a target of noise reduction. The standard deviation of the noise only in this region is calculated to be 25.6. FIG. 5C shows pixel values of the same 5×5 region of an image obtained by applying a non-local means filter to the image data of FIG. 5B on which the noise exists. As a result of the application of the non-local means filter, the standard deviation of the noise is reduced to 3.57 and this shows that the noise is reduced. However, pixels whose pixel values in FIG. 5B are smaller than 100 which is the true pixel value tend to have pixel values smaller than 100 also in FIG. 5C to which the non-local means filter is applied. Meanwhile, it can be found that the pixels whose pixel values in FIG. 5B are greater than 100 tend to have pixel values greater than 100 also in FIG. 5C to which the non-local means filter is applied. This is the remaining noise. FIG. 5D is a result obtained by reducing the remaining noise by the process described in the embodiment. Specifically, FIG. 5D is an example in which the process is performed according to formula (14) with the parameter γ set to 1.167. For example, in the case of the pixel at the upper left corner, 102 included in FIG. 5C is substituted into $I_{i,new,exp}$ and 110 included in FIG. 5B is substituted into $I_i$. Thus, formula (14) is 1.167×102−0.167×110=100.664 and this result is rounded to obtain the pixel value after the remaining noise reduction of 101. The standard deviation of the noise in FIG. 5D is reduced to 0.73 as a result of such a process and it can be found that the noise is further reduced from that of FIG. 5C and the FIG. 5D is closer to the FIG. 5A whose pixel values are the true pixel values.

<Remaining Noise Reduction Process>

Figure 6:
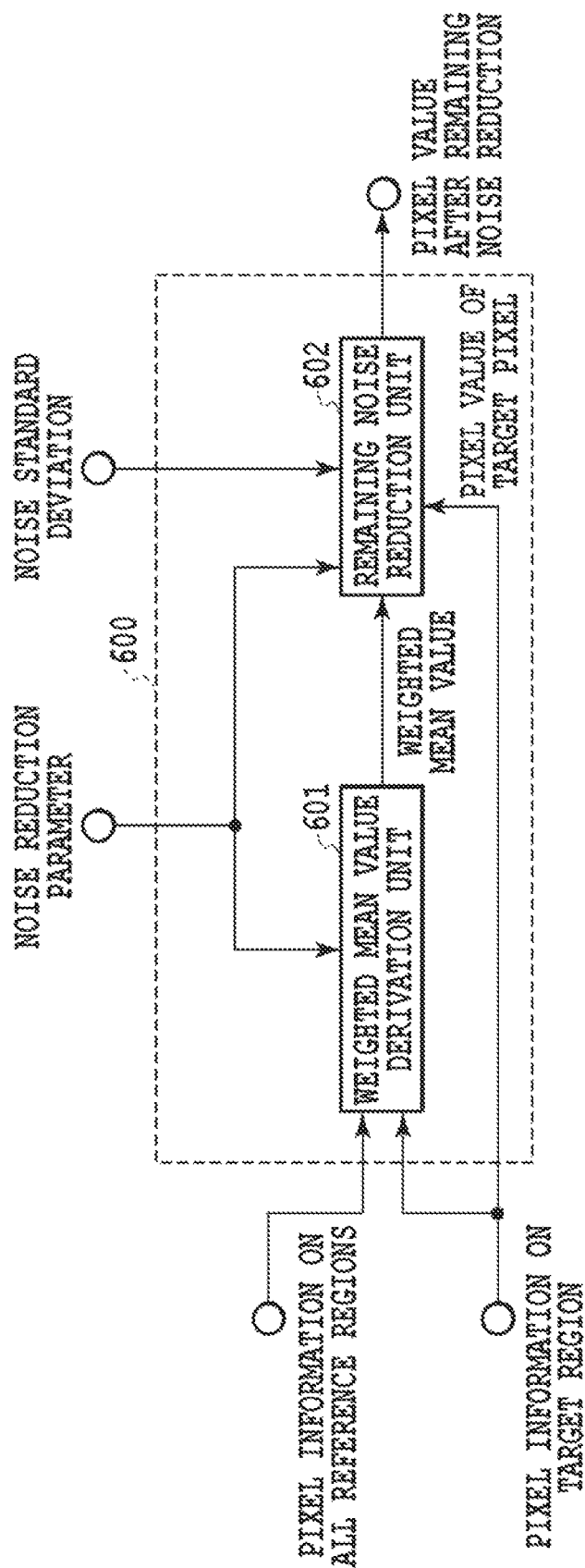
FIG. 6 is a block diagram showing an example of a configuration of an image processing unit in a first embodiment.
Figure 7:
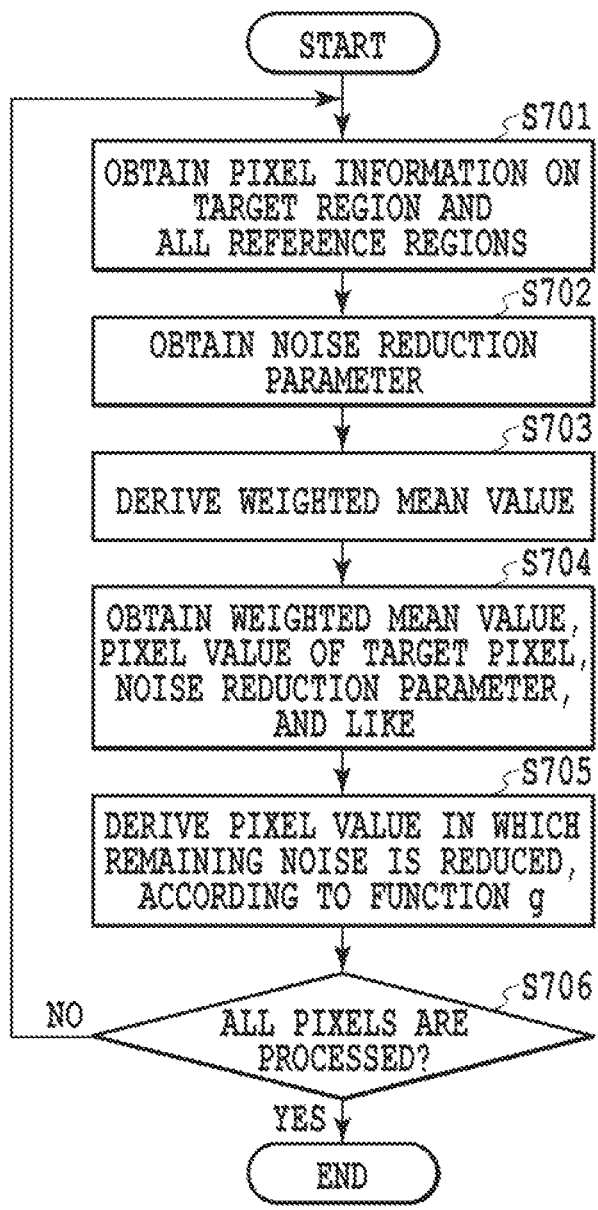
FIG. 7 is a flowchart showing an example of a processing flow in the first embodiment.

Next, description is given of a specific image processing apparatus and method for performing the remaining noise reduction process by using the block diagram of FIG. 6 and the flowchart of FIG. 7. Here, description is given of an example in which the similarity between the target pixel and each of the reference pixels is calculated based on the difference between each of the pixels in the target region and a corresponding one of the pixels in the reference regions, as in the aforementioned non-local means method.

FIG. 6 is a block diagram showing an example of an image processing unit 600 in the image processing apparatus of the embodiment, and the image processing unit 600 performs the process for each of pixels in an inputted image. An image with little remaining noise can be obtained by performing the process for all of the pixels. The image processing unit 600 includes a weighted mean value derivation unit 601 and a remaining noise reduction unit 602.

The weighted mean value derivation unit 601 receives pixel information on all of the reference regions, pixel information on the target region, and the noise reduction parameter and outputs the weighted mean value. The remaining noise reduction unit 602 receives the weighted mean value outputted from the weighted mean value derivation unit, the noise reduction parameter, the pixel value of the target pixel, and, if necessary, the noise standard deviation and outputs the pixel value after the remaining noise reduction.

In the image processing as a whole, first, the noise reduction process is performed by the weighted mean value derivation unit 601 and then the process of reducing the remaining noise is performed by the remaining noise reduction unit 602.

In step S701 of FIG. 7, first, the weighted mean value derivation unit 601 obtains the pixel information on the target region and the pixel information on all of the reference regions. Here, the pixel information includes information such as the pixel values and pixel positions, for example. Then, in step S702, the weighted mean value derivation unit 601 obtains the noise reduction parameter. Note that steps S701 and S702 can be performed in the opposite order or performed in parallel. In step S703, the weighted mean value derivation unit 601 derives the weighted mean value on the basis of the pixel information on the target region and all of the reference regions obtained in step S701 and the noise reduction parameter obtained in step S702.

Here, the target region and the reference regions each refer to a region required to calculate the similarity between the target pixel and each of the reference pixels. The specific shapes of the target region and the reference regions depend on how the similarity and the weight are calculated. For example, in the non-local means filter, since block matching is performed, the shapes of blocks are the shapes of the target region and the reference regions. In the bilateral filter, since the similarity is calculated based on the difference between the pixel values of the target pixel and each of the reference pixels and the distance between these pixels, the target pixel corresponds to the target region and the reference pixels correspond to the reference regions.

For example, the standard deviation or variance of the noise may be included in the noise reduction parameter. Generally, the standard deviation or variance of the noise is dependent on image capturing parameters such as sensitivity. Since obtaining a value considering the image capturing parameters is well known, detailed description thereof is omitted herein. The processes performed from the start to the derivation of the weighted mean value can be performed by using a publicly-known technique like one described in <Description of Noise Reduction Process>. The weighted mean value derivation unit 601 outputs the derived weighted mean value to the remaining noise reduction unit 602.

Next, in step S704, the remaining noise reduction unit 602 obtains the weighted mean value derived by the weighted mean value derivation unit 601, the pixel value of the target pixel, the noise reduction parameter, and, if necessary, the standard deviation of the noise. Specifically, the remaining noise reduction unit 602 obtains the aforementioned pixel value $I_{i,new}$ after the noise reduction, the pixel value $I_i$ of the target pixel, the noise reduction parameter $\xi_{method}$, and, if necessary, the pixel value distribution model parameter $\sigma_{true}$ showing the noise characteristics.

Next, in step S705, the remaining noise reduction unit 602 derives an output value (pixel value) in which the remaining noise is reduced, according to the function g as described above. As described above, the function g varies depending on the noise reduction parameter $\xi_{method}$ and the pixel value distribution model parameter $\sigma_{true}$ and description of specific processes performed in respective cases is omitted. In any of the processes, the true pixel value $I_{i,true}$ of the target pixel is set at the point which externally divides the section between the pixel value $I_i$ before the noise reduction process and the pixel value $I_{i,new}$ after the noise reduction process and which is on the $I_{i,new}$ side, and the remaining noise is reduced.

In step S706, the image processing unit 600 determines whether all of the pixels are processed.

Specifically, the image processing unit 600 determines whether the processes from steps S701 to S705 are performed with all of the pixels being set as the target pixel. In a case where the image processing unit 600 determines that not all of the pixels are processed, the processing returns to step S701. Meanwhile, in a case where the image processing unit 600 determines that all of the pixels are processed, the processing is completed.

As described above, in the embodiment, it is possible to calculate the weight according to the similarity between the target pixel and each of the reference pixels, derive the weighted mean value, and reduce the remaining noise occurring in the case where the noise is reduced. Hence, better image data after the noise reduction can be obtained.

<Second Embodiment>

The configuration of an image processing apparatus in a second embodiment is similar to that in FIG. 1 of the first embodiment. Accordingly, description thereof is omitted and portions different from those of the first embodiment are described.

The first embodiment is an embodiment of a case where the form of the function g can be analytically evaluated by using approximates and the like. Meanwhile, in the second embodiment, description is given of the case where the form of the function g cannot be analytically evaluated. In a case where the form of the function g cannot be analytically evaluated, a correction table is created by performing numerical calculation in advance. Then, reduction of remaining noise is performed according to a parameter by referring to the correction table.

Figure 8:
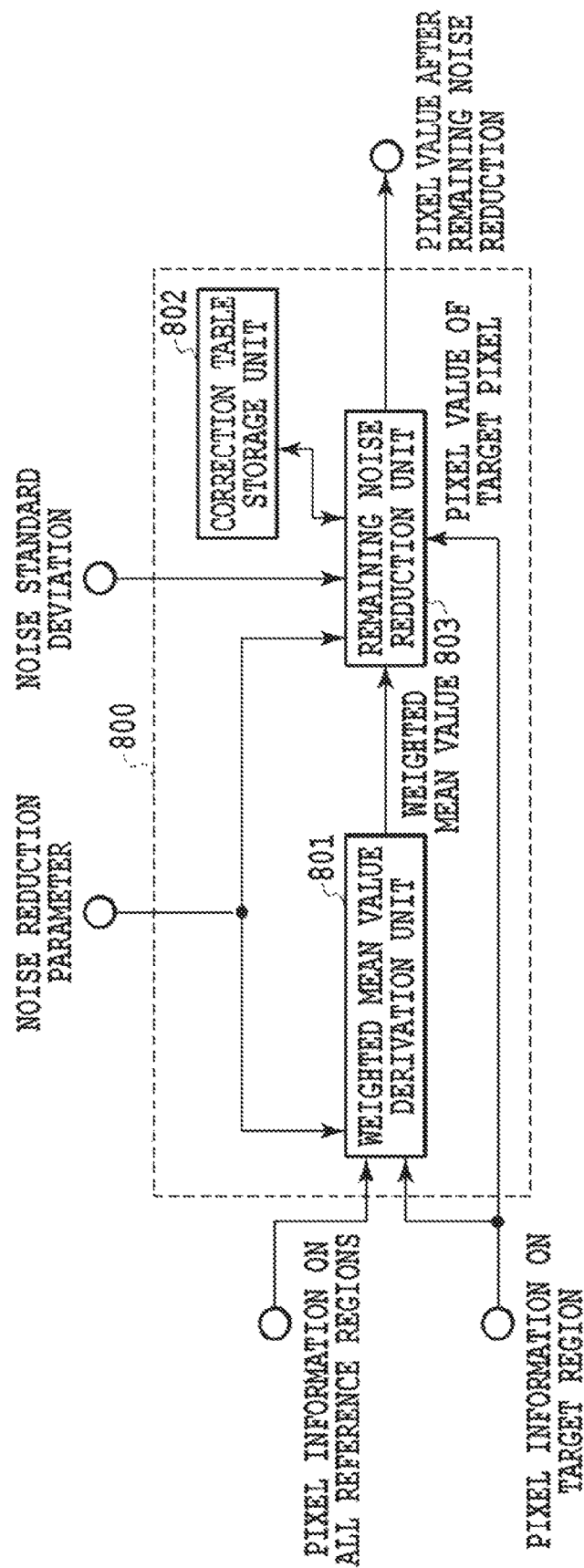
FIG. 8 is a block diagram showing an example of a configuration of an image processing unit in a second embodiment.

Processing of the second embodiment is described below by using the block diagram of FIG. 8 and the flowchart of FIG. 9. Like FIG. 6, FIG. 8 is a block diagram of a portion performing the process for each of pixels of an inputted image. An image processing unit 800 shown in FIG. 8 includes a weighted mean value derivation unit 801, a correction table storage unit 802, and a remaining noise reduction unit 803. The image processing unit 800 is different from that of FIG. 6 in that it includes the correction table storage unit 802. The remaining noise reduction unit 803 performs a remaining noise reduction process by referring to a correction table stored in the correction table storage unit.

The correction table is used to obtain the pixel value after the remaining noise reduction from the weighted mean value, the target pixel value, the noise reduction parameter, and the pixel value distribution model parameter. The correction table is created by numerically evaluating the function g. Alternatively, the correction table may be created by obtaining the function g through a simulation. The function g can be obtained through a simulation in the following way, for example. First, correct image data showing a known image which is made with CG and which has very little noise is created. Then, noise is added to the correct image data to create noise added image data. Thereafter, a noise reduction process based on a predetermined publicly-known technique is performed to create noise reduced image data. Lastly, a correlation among the correct image data, the noise added image data, and the noise reduced image data is examined to determine the form of the function g. The correct image data, the noise added image data, and the noise reduced image data correspond respectively to $I_{i,true}$, $I_i$, and $I_{i,new,exp}$.

Figure 9:
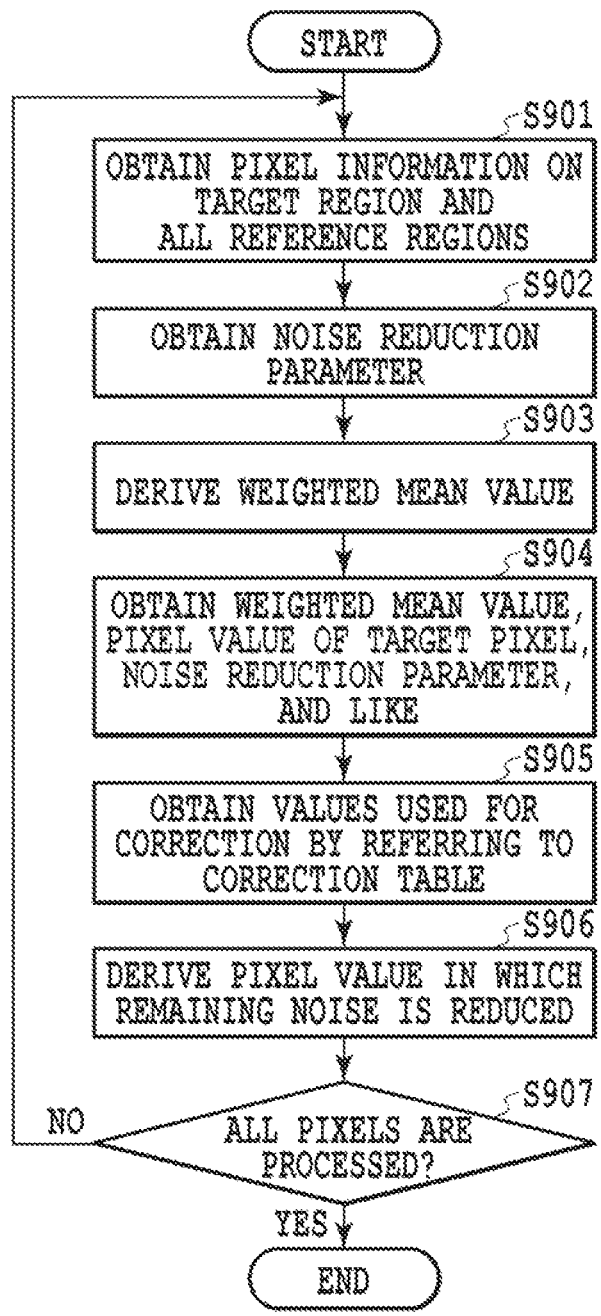
FIG. 9 is a flowchart showing an example of a processing flow in the second embodiment.

Next, a specific remaining noise process method is described by using the block diagram of FIG. 8 and the flowchart of FIG. 9. Note that the correction table created by the method described above is assumed to be stored in the correction table storage unit. Since processes from steps S901 to S903 are the same as those described in the first embodiment, description thereof is omitted. In step S904, the remaining noise reduction unit 803 obtains the weighted mean value derived by the weighted mean value derivation unit 801, the pixel value of the target pixel, the noise reduction parameter, and, if necessary, the standard deviation of the noise. Then, in step S905, the remaining noise reduction unit 803 obtains values for correcting the remaining noise from the correction table storage unit 802, on the basis of the pixel value and the parameter which are obtained in step S904. In step S905, for example, the remaining noise reduction unit 803 obtains values such as the true pixel value $I_{i,true}$ of the target pixel and the expected value $I_{i,new,exp}$ of the pixel after the noise reduction. Next, in step S906, the remaining noise reduction unit 803 derives the pixel value after the remaining noise reduction, according to the function g as described above, on the basis of the information obtained in steps S904 and S905.

In step S907, the image processing unit 800 determines whether all of the pixels are processed. In a case where the image processing unit 800 determines that not all of the pixels are processed, the process returns to step S901. Meanwhile, in a case where the image processing unit 800 determines that all of the pixels are processed, the processing is completed.

As described above, in the embodiment, a good image data after the noise reduction which has little noise can be obtained even in the case where the form of the function g cannot be analytically evaluated.

<Third Embodiment>

In a third embodiment, description is given of a process in which the remaining noise reduction is performed only in a region where the pixel values are substantially constant. Since the configuration of an image processing apparatus in the third embodiment is the same as that in FIG. 1 of the first embodiment, description thereof is omitted.

Figure 10:
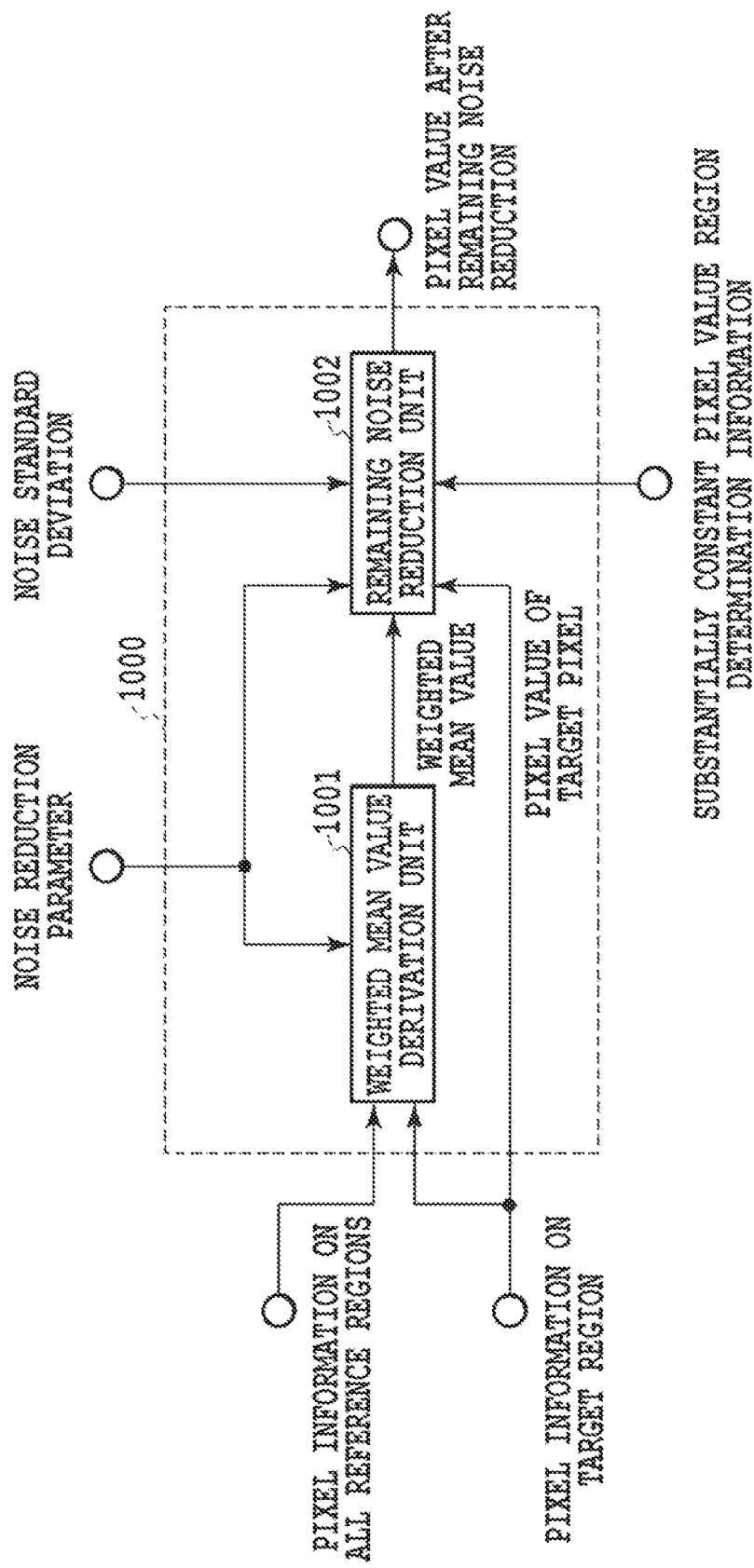
FIG. 10 is a block diagram showing an example of a configuration of an image processing unit in a third embodiment.
Figure 11:
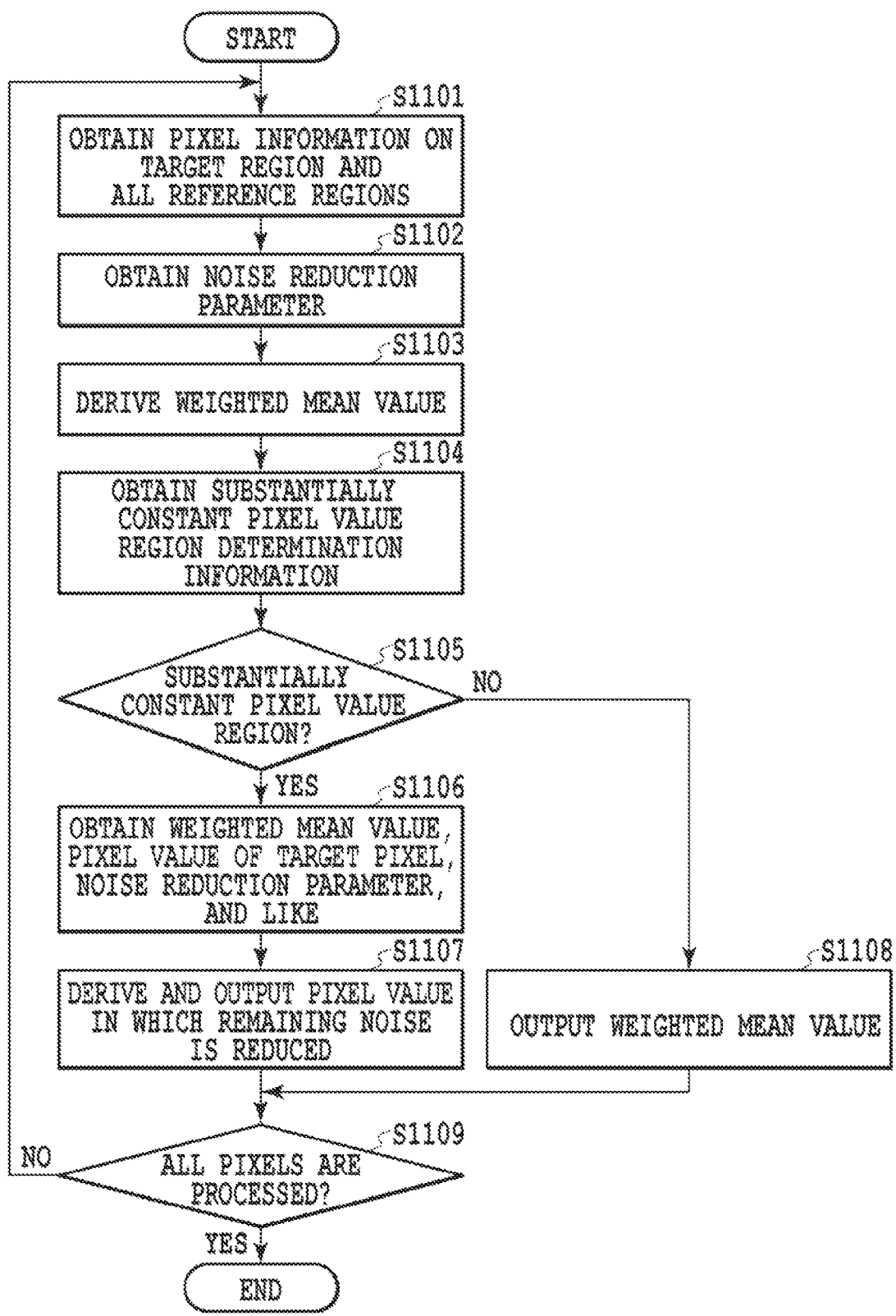
FIG. 11 is a flowchart showing an example of a processing flow in the third embodiment.

Processing of the third embodiment is described below by using the block diagram of FIG. 10 and the flowchart of FIG. 11. Like FIG. 6, FIG. 10 is a block diagram of a portion performing the process for each of pixels of an inputted image. An image processing unit 1000 shown in FIG. 10 includes a weighted mean value derivation unit 1001 and a remaining noise reduction unit 1002. The image processing unit 1000 is different from that of FIG. 6 in that substantially constant pixel value region determination information is inputted to the remaining noise reduction unit 1002 configured to perform the remaining noise reduction process. The substantially constant pixel value region determination information is information on a result of determination on whether pixel values of respective pixels are substantially constant in a region around the target pixel. A publically-known technique can be used to determine whether a region is the region where the pixel values are substantially constant. For example, it is possible to calculate the variance of the pixel values in a region around the target pixel and determine that the region is the region where the pixel values are substantially constant in a case where the calculated variance is smaller than about twice the variance of the noise.

A specific remaining noise reduction process method is described below by using FIG. 11. Since processes from steps S1101 to S1103 are the same as those in the first embodiment, description thereof is omitted.

In step S1104, the remaining noise reduction unit 1002 obtains information on the result of determination on whether the pixel values around the target pixel are substantially constant. In step S1105, the remaining noise reduction unit 1002 determines whether to perform the remaining noise reduction process on the basis of the information obtained in step S1104. In a case where the remaining noise reduction unit 1002 determines that the pixel values around the target pixel are substantially constant in step S1105, the remaining noise reduction unit 1002 causes the processing to proceed to step S1106. Meanwhile, in a case where the remaining noise reduction unit 1002 determines that the pixel values around the target pixel are not substantially constant in step S1105, the remaining noise reduction unit 1002 causes the processing to proceed to step S1108.

In a case where the remaining noise reduction unit 1002 determines that the pixel values are substantially constant, in step S1106, the remaining noise reduction unit 1002 obtains the weighted mean value derived in step S1103, the pixel value of the target pixel, the noise reduction parameter, and, if necessary, the standard deviation of the noise. In step S1107, the remaining noise reduction unit 1002 derives the pixel value in which remaining noise is reduced, according to the function g, and outputs the derived pixel value.

Meanwhile, in a case where the remaining noise reduction unit 1002 determines that the pixel values are not substantially constant, in step S1108, the remaining noise reduction unit 1002 outputs the weighted mean value as the pixel value after the remaining noise reduction. In step S1109, the image processing unit 1000 determines whether all of the pixels are processed. In a case where the image processing unit 1000 determines that not all of the pixels are processed, the processing returns to step S1101. Meanwhile, in a case where the image processing unit 1000 determines that all of the pixels are processed, the processing is completed.

In the embodiment, the remaining noise reduction process can be performed only in a region where the remaining noise tends to be recognized, by using the information indicating a region where the pixel values are substantially constant.

<Fourth Embodiment>

In the third embodiment, description is given of the process in which the remaining noise reduction is performed only in the region where the pixel values are substantially constant. In a fourth embodiment, an example is shown in which, in a case where information identifying a texture around the target pixel in detail is obtained, correction processes are switched depending on this information. Specifically, an example is shown in which, in a case where the target pixel is classified into one of three categories of (1) edge portion, (2) substantially constant pixel value region, and (3) other region, a table used for correction is changed depending on whether the target pixel is the edge portion or not.

Since the configuration of an image processing apparatus in the fourth embodiment is the same as that of FIG. 1 of the first embodiment, description thereof is omitted.

Figure 12:
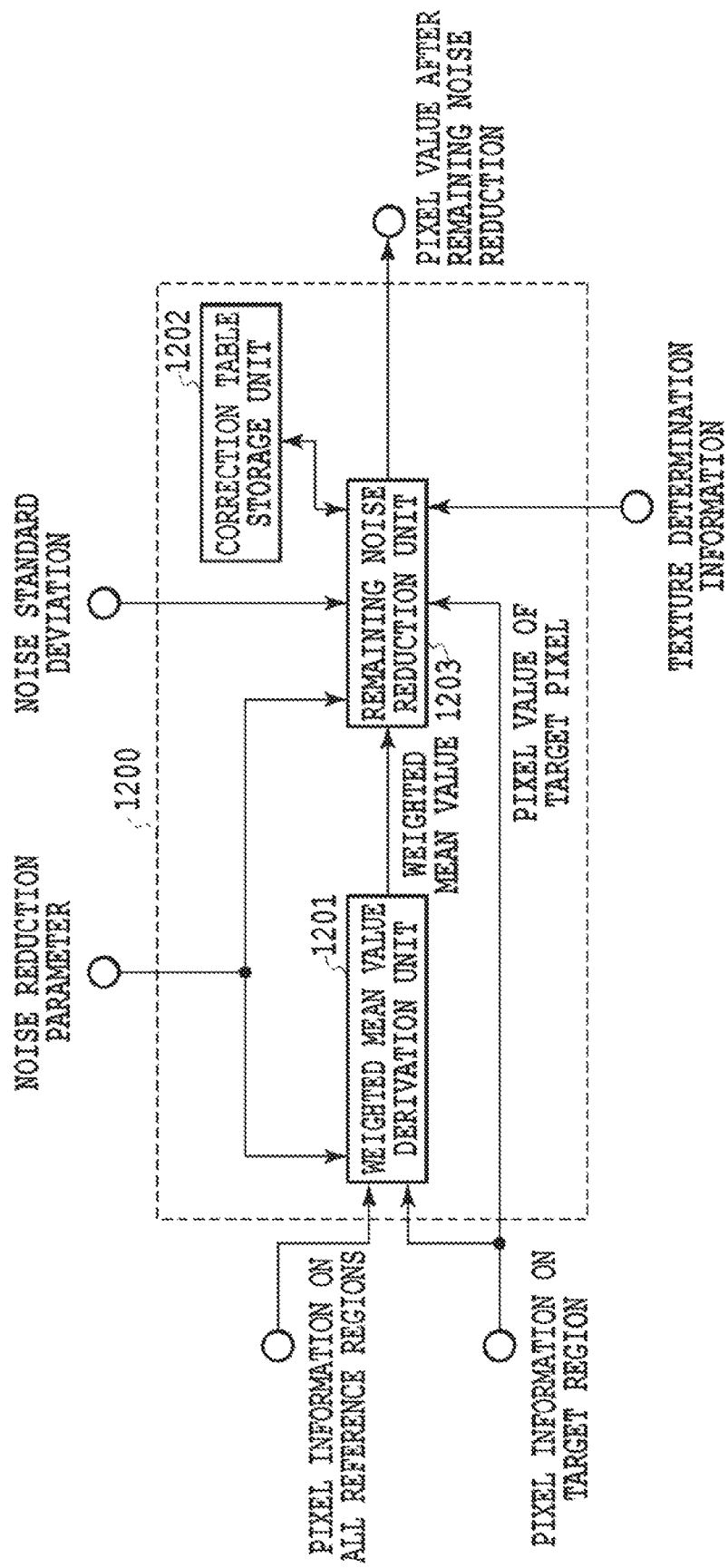
FIG. 12 is a block diagram showing an example of a configuration of an image processing unit in a fourth embodiment.
Figure 13:
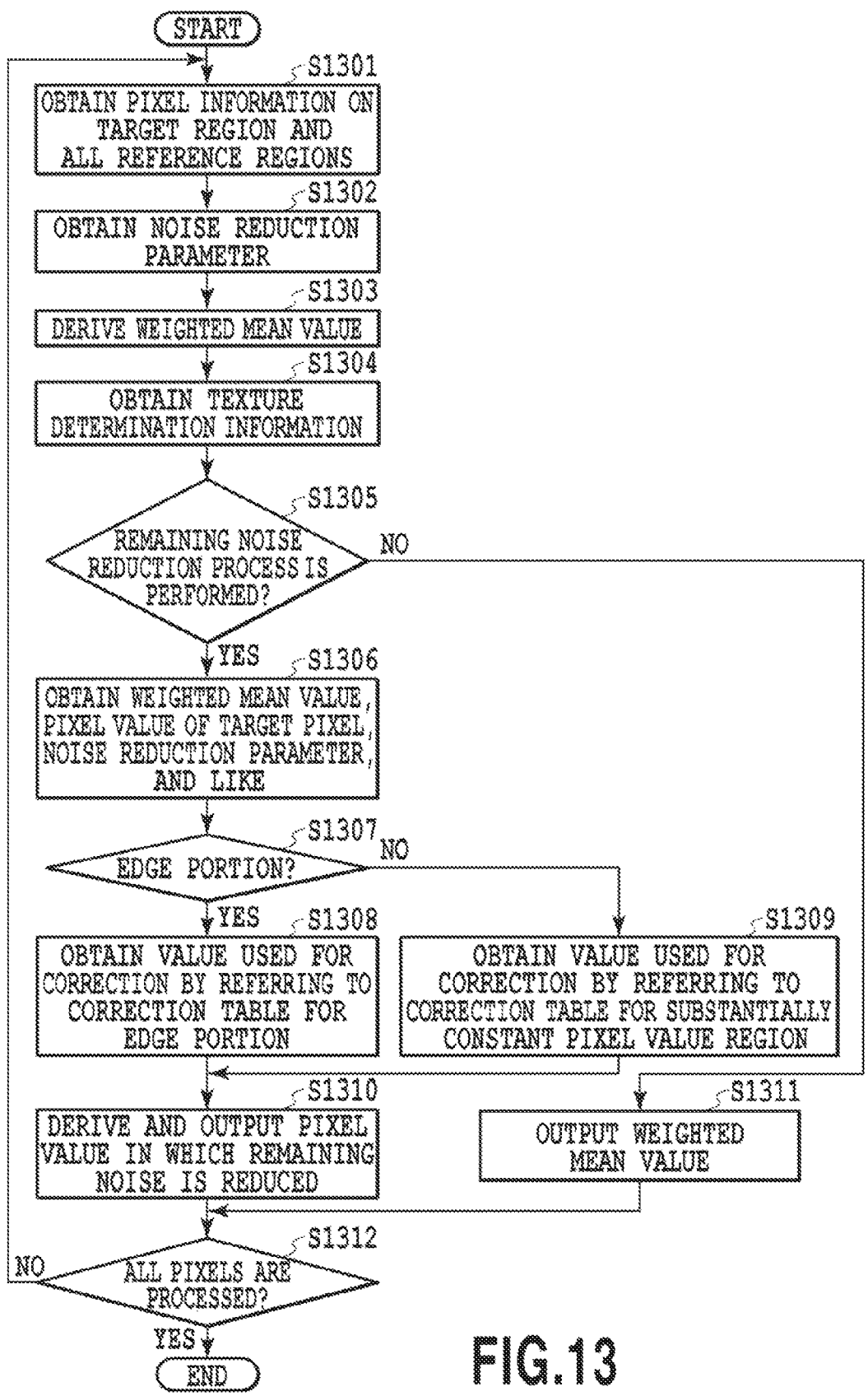
FIG. 13 is a flowchart showing an example of a processing flow in the fourth embodiment.

The process of the fourth embodiment is described below by using the block diagram of FIG. 12 and the flowchart of FIG. 13. Like FIG. 8, FIG. 12 is a block diagram of a portion performing the process for each of pixels of an inputted image. An image processing unit 1200 of FIG. 12 includes a weighted mean value derivation unit 1201, a correction table storage unit 1202, and a remaining noise reduction unit 1203. The image processing unit 1200 is different from that of FIG. 8 in that the remaining noise reduction unit 1203 configured to perform the remaining noise reduction process receives texture determination information on a result of determination on whether the target pixel is the substantially constant pixel value region, the region including an edge, or neither of those regions. The texture determination information on the region including an edge includes pixel values of pixels on both sides of the edge or the difference between these pixel values. This is one type of pixel value distribution model parameter $\sigma_{true}$. Note that the correction tables stored in the correction table storage unit 1202 are created by evaluating the function g through simulations respectively for the substantially constant pixel value region and the edge portion. In other words, the correction table storage unit 1202 stores a correction table for the substantially constant pixel value region and a correction table for the edge portion.

A specific remaining noise process method is described below by referring to FIG. 12. Since processes from steps S1301 to S1303 are the same as those in the first embodiment, description thereof is omitted.

In step S1304, the remaining noise reduction unit 1203 obtains the texture determination information around the target pixel. Then, in step S1305, the remaining noise reduction unit 1203 determines whether to perform the remaining noise reduction process on the basis of the texture determination information. For example, in a case where the texture determination information shows that the target pixel is the edge portion or the substantially constant pixel value region, the remaining noise reduction unit 1203 determines to perform the remaining noise reduction process. This determination can be performed by, for example, applying various kinds of publicly-known filters to the inputted image data. Meanwhile, in a case where the texture determination information shows that the target pixel is the other region, the remaining noise reduction unit 1203 determines not to perform the remaining noise reduction process.

In the case where the remaining noise reduction unit 1203 determines to perform the remaining noise reduction process, in step S1306, the remaining noise reduction unit 1203 obtains the weighted mean value derived in step S1303, the pixel value of the target pixel, the noise reduction parameter, and, if necessary, the standard deviation of the noise. In step S1307, the remaining noise reduction unit 1203 determines whether the target pixel is the edge portion on the basis of the texture determination information obtained in step S1304.

In a case where the remaining noise reduction unit 1203 determines that the target pixel is the edge portion, the remaining noise reduction unit 1203 causes the process to proceed to step S1308. In step S1308, the remaining noise reduction unit 1203 refers to the correction table corresponding to the edge portion to obtain a value for correcting the remaining noise from the correction table storage unit 1202.

In a case where the remaining noise reduction unit 1203 determines that the target pixel is not the edge portion, the remaining noise reduction unit 1203 causes the process to proceed to step S1309. In step S1309, the remaining noise reduction unit 1203 refers to the correction table corresponding to the substantially constant pixel value region to obtain a value for correcting the remaining noise from the correction table storage unit 1202.

In step S1310, the remaining noise reduction unit 1203 derives the pixel value after the remaining noise reduction by using the value obtained in step S1308 or S1309 and outputs the derived pixel value.

In a case where the remaining noise reduction unit 1203 determines not to perform the remaining noise reduction process in step S1305, in step S1311, the remaining noise reduction unit 1203 outputs the weighted mean value as the pixel value in which the remaining noise is reduced.

In step S1311, the image processing unit 1200 determines whether all of the pixels are processed. In a case where the image processing unit 1200 determines that not all of the pixels are processed, the image processing unit 1200 causes the processing to return to step S1301. Meanwhile, in a case where the image processing unit 1200 determines that all of the pixels are processed, the processing is completed.

In the embodiment, a more suitable remaining noise process can be selected and executed for each target pixel by using the information on the texture of the target pixel.

In the fourth embodiment, description is given of the example in which the weighted mean value is outputted for the target pixel determined to be the other region. However, the same reduction process as that for the substantially constant pixel value region can be performed for the target pixel determined to be the other region, in addition to the substantially constant pixel value region.

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-037743, filed Feb. 27, 2013 which is hereby incorporated by reference herein in its entirety.

What is claimed is:

1. An image processing apparatus comprising:
at least one hardware processor; and
at least one memory coupled to the at least one hardware processor and having stored thereon instructions which, when executed by the hardware processor, cause the at least one hardware processor to:
perform a noise reduction process on image data including noise to obtain noise reduced image data;
calculating a weighted mean value of each pixel value of a plurality of reference pixels for each target pixel in the noise reduced image data and
determine an output value of each target pixel by calculating a true value of the target pixel on the basis of a predetermined correlation to be established among the weighted mean value for each target pixel in the noise reduced image data, a pixel value of the target pixel in the image data, and a noise reduction parameter.

2. The image processing apparatus according to claim 1, wherein the weighted mean value is a result of weighted mean performed by using a weight determined according to similarity between a target region and a reference region.

3. The image processing apparatus according to claim 1, wherein the weighted mean value is a result of weighted mean performed by using a weight determined based on the pixel value of the target pixel and a pixel value of a reference pixel.

4. The image processing apparatus according to claim 1, wherein the output value is determined on the basis of a characteristic of the noise included in the target pixel, in addition to the predetermined correlation.

5. The image processing apparatus according to claim 4, wherein the characteristic of the noise is a standard deviation of the noise.

6. The image processing apparatus according to claim 1, wherein the predetermined correlation is determined depending on at least one of noise reduction parameters for calculating the weighted mean value and at least one of pixel value distribution model parameters.

7. The image processing apparatus according to claim 1, wherein the output value is determined by referring to a table created based on the predetermined correlation in advance.

8. The image processing apparatus according to claim 1, wherein point, which externally divides a section between the pixel value of the target pixel and the weighted mean value and which is on the weighted mean value side, is determined as the output value.

9. The image processing apparatus according to claim 1, wherein the at least one memory has stored thereon further instructions which, when executed by the hardware processor, cause the at least one hardware processor to:
judge whether the target pixel belongs to a region where the pixel values are constant; and
output the output value determined as the value of the target pixel in a case where it is not judged that the target pixel belongs to a constant region, and output the weighted mean value as the value of the target pixel in a case where it is not judged that the target pixel belongs to the constant region.

10. The image processing apparatus according to claim 1, wherein the at least one memory has stored thereon further instructions which, when executed by the hardware processor, cause the at least one hardware processor to obtain texture determination information for identifying a texture around the target pixel,
wherein it is determined whether to use the output value on the basis of the texture determination information.

11. The image processing apparatus according to claim 10, wherein the at least one memory has stored thereon further instructions which, when executed by the hardware processor, cause the at least one hardware processor to judge whether to output the output value or the weighted mean value as the value of the target pixel, on the basis of the texture determination information.

12. The image processing apparatus according to claim 1, wherein all pixels in the image data are set to be the target pixels in order and a weighted mean value of pixel values of the plurality of reference pixels calculated for the target pixel is calculated by setting a different combination of pixels for each of pixel positions for the target pixel as reference pixels.

13. The image processing apparatus according to claim 1, wherein the plurality of reference pixels corresponding to the target pixel are a group of pixels included in a predetermined region with the target pixel at a center.

14. The image processing apparatus according to claim 1, wherein the at least one memory has stored thereon further instructions which, when executed by the hardware processor, cause the at least one hardware processor to obtain parameters to be used for a noise reduction process for calculating weighted means of pixel values of the plurality of reference pixels, the weighted mean value of pixel values of the plurality of reference pixels obtained as a result of the noise reduction process using the parameters, and the pixel value of the target pixel in the image data, wherein the predetermined correlation is defined by a function derived according to the parameters.

15. The image processing apparatus according to claim 1, wherein the at least one memory has stored thereon further instructions which, when executed by the hardware processor, cause the at least one hardware processor to store a lookup table indicating correlation depending on parameters to be established among the weighted mean value of pixel values of the plurality of reference pixels obtained as a result of the noise reduction process using the parameters, the pixel value of the target pixel in the image data, and the noise reduction parameter,
wherein the output value of the target pixel is determined by referring to the lookup table, and
wherein the lookup table is a table created on the basis of correlation of pixel values among correct image data showing a known image having very little noise, noise added image data obtained by adding noise to the correct image data, and noise reduced image data obtained by performing the noise reduction process using the parameters.

16. The image processing apparatus according to claim 1, wherein the true value is an ideal value including no noise.

17. An image processing method comprising:
performing a noise reduction process on image data including noise to obtain noise reduced image data;
calculating a weighted mean of each pixel value of a plurality of reference pixels for each target pixel in the noise reduced image data; and
determining an output value of each target pixel by calculating a true value of the target pixel on the basis of a predetermined correlation to be established among the weighted mean value for each target pixel in the noise reduced image data, a pixel value of the target pixel in the image data including the noise, and a noise reduction parameter.

18. A non-transitory computer readable storage medium storing a program for causing a computer to perform a method comprising:
performing a noise reduction process on image data including noise to obtain noise reduced image data;
calculating a weighted mean of each pixel value of a plurality of reference pixels for each target pixel in the noise reduced image data and
determining an output value of each target pixel by calculating a true value of the target pixel on the basis of a predetermined correlation to be established among the weighted mean value for each target pixel in the noise reduced image data, a pixel value of the target pixel in the image data including the noise, and a noise reduction parameter.

* * * * *